(12) United States Patent
Funke et al.

(10) Patent No.: US 6,709,482 B2
(45) Date of Patent: Mar. 23, 2004

(54) METHOD FOR REDUCING TRACE IMPURITIES FROM A REACTIVE FLUID USING PRECONDITIONED ULTRA-LOW EMISSION CARBON MATERIAL

(75) Inventors: Hans H. Funke, Boulder, CO (US); Dan Fraenkel, Boulder, CO (US); Virginia H. Houlding, Boulder, CO (US)

(73) Assignee: Matheson Tri-Gas, Inc., Longmont, CO (US)

( * ) Notice: Subject to any disclaimer, the term of this patent is extended or adjusted under 35 U.S.C. 154(b) by 0 days.

(21) Appl. No.: 10/263,134

(22) Filed: Oct. 2, 2002

(65) Prior Publication Data

US 2003/0024391 A1 Feb. 6, 2003

Related U.S. Application Data

(60) Division of application No. 09/777,741, filed on Feb. 6, 2001, now Pat. No. 6,547,861, which is a continuation-in-part of application No. 09/748,734, filed on Dec. 26, 2000, now Pat. No. 6,425,946.

(51) Int. Cl.⁷ .......................... B01D 53/02; B01D 53/28
(52) U.S. Cl. .................. 95/8; 95/117; 95/139; 95/140; 95/143; 95/901; 502/418
(58) Field of Search ................ 95/8, 90, 117, 95/139, 140, 141, 143, 147, 901, 903; 96/108; 502/180, 416, 418, 519; 206/0.7; 53/432; 252/194; 210/660, 679, 694

(56) References Cited

U.S. PATENT DOCUMENTS

| | | | |
|---|---|---|---|
| 2,283,989 A | 5/1942 | Henry | 210/134 |
| 4,147,626 A | 4/1979 | Findlay et al. | 210/52 |
| 4,603,148 A | 7/1986 | Tom | 521/31 |
| 4,738,694 A | 4/1988 | Godino et al. | 55/59 |
| 4,761,395 A | 8/1988 | Tom et al. | 502/401 |
| 4,786,294 A | 11/1988 | Jonqueres et al. | 55/28 |
| 4,966,611 A | 10/1990 | Schumacher et al. | 55/20 |
| 5,015,411 A * | 5/1991 | Tom et al. | 252/194 |
| 5,443,736 A | 8/1995 | Szmanda et al. | 210/668 |
| 5,704,965 A | 1/1998 | Tom et al. | 95/95 |
| 5,833,726 A | 11/1998 | Kinkead et al. | 55/356 |
| 6,022,398 A | 2/2000 | Cho et al. | 95/98 |
| 6,131,368 A | 10/2000 | Tramposch et al. | 53/400 |
| 8,211,254 | 4/2001 | Whitney | 518/704 |
| 6,241,955 B1 * | 6/2001 | Alvarez, Jr. | 423/210 |
| 6,461,411 B1 * | 10/2002 | Watanabe et al. | 95/116 |
| 6,524,544 B1 * | 2/2003 | Alvarez et al. | 423/352 |

FOREIGN PATENT DOCUMENTS

| | | | |
|---|---|---|---|
| JP | 55090419 A | * | 7/1980 |
| JP | 06024737 A | * | 2/1994 |
| JP | 10297919 A | * | 11/1998 |

OTHER PUBLICATIONS

S.S. Barton, et al. "Water and Cyclohexane Vapour Adsorption on Oxidized Porous Carbon," *Carbon*, vol. 22, pp. 265–272 (1984).

* cited by examiner

Primary Examiner—Frank M. Lawrence
(74) Attorney, Agent, or Firm—Steven C. Petersen; Sarah O'Rourke; Hogan & Hartson LLP

(57) ABSTRACT

Trace impurities such as organic compounds and carbon monoxide in reactive fluids such as ammonia, hydrogen chloride, hydrogen bromide, and chlorine are reduced to sub-ppb levels using gas purifying systems that contain a preconditioned ultra-low emission (P-ULE) carbon. P-ULE is capable of removing impurities from a reactive fluid down to parts-per-billion (ppb) and sub-ppb levels without concurrently emitting other impurities such as moisture or carbon dioxide into the purified reactive fluid. The P-ULE carbon is prepared by heating a carbon material to temperatures from 300° C. to about 800° C. in an ultra-dry, inert gas stream, to produce an ultra-low emission (ULE) carbon material, subjecting the ULE carbon to a second activation process under a reactive gas atmosphere to produce a P-ULE carbon and storing the P-ULE carbon in an environment that minimizes contamination of the P-ULE prior to its use in a gas purifier system.

11 Claims, 10 Drawing Sheets

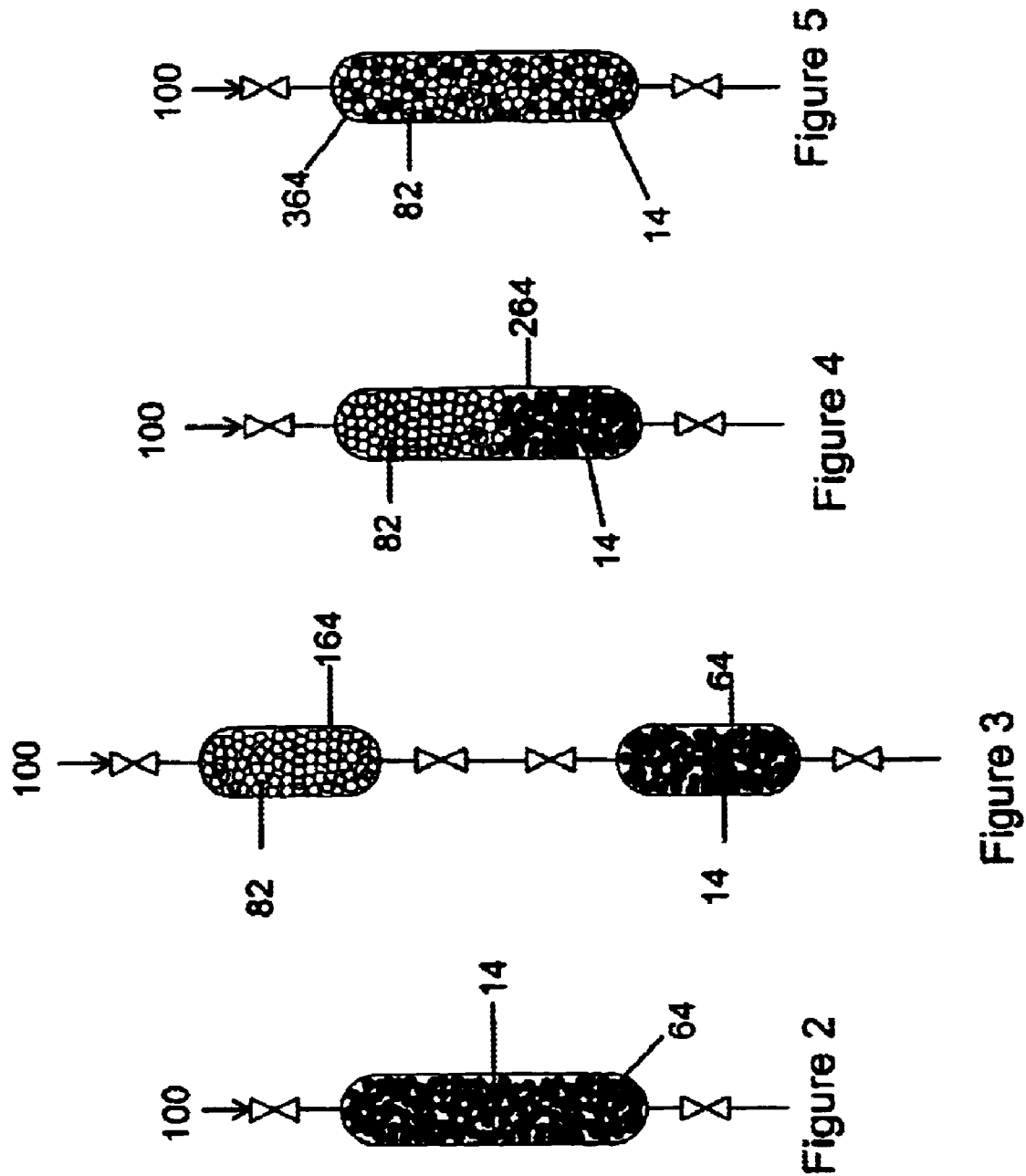

METHOD FOR REDUCING TRACE IMPURITIES FROM A REACTIVE FLUID USING PRECONDITIONED ULTRA-LOW EMISSION CARBON MATERIAL

RELATED APPLICATIONS

The present invention is a divisional of U.S. patent application Ser. No. 09/777,741, filed Feb. 6, 2001 now U.S. Pat. No. 6,547,861, which is a Continuation-in-Part application of U.S. patent application Ser. No. 09/748,734, filed Dec. 26, 2000, now issued as U.S. Pat. No. 6,425,946.

BACKGROUND OF THE INVENTION

1. Field of the Invention

This invention relates to the field of purification of fluids, and more specifically to the removal of trace contaminants from inert, non-reactive gases and reactive fluids using solid scavenger adsorption materials, without concurrently emitting water vapor or other contaminants into the gas stream. More particularly, this invention provides methods for reducing concentrations of trace contaminants in inert and non-reactive gases to parts-per-billion (ppb) and sub-parts-per-billion (sub-ppb) levels using an ultra-low emission carbon based scavenger, wherein the impurities include carbon monoxide, carbon dioxide, and organic compounds such as hydrocarbons. This invention further provides methods for reducing concentrations of trace impurities in reactive fluids to parts-per-billion and sub-parts-per-billion levels using a preconditioned ultra-low emission carbon based scavenger, wherein the impurities include carbon monoxide, carbon dioxide, and organic compounds such as hydrocarbons.

2. Description of the Prior Art

Inert and non-reactive gases such as nitrogen, helium, and argon are widely used in the semiconductor industry for the manufacture of microcircuitry devices. In such applications, it is critical that the gases be essentially completely free of impurities such as water and oxygen. For example, in semiconductor fabrication processes, gases such as nitrogen, helium and argon are often required to not have more than low ppb or sub-ppb impurity levels to ensure that the impurities do not degrade the quality, and hence the performance of the semiconductor chips. Such impurities, when introduced onto the semiconductor chip during its manufacture, tend to render the chip deficient or even useless for its intended purpose. Thus, a growing number of industries are now requiring gases having impurity concentrations that do not exceed about 10 parts-per-billion (ppb) levels.

In addition, semiconductor fabrication processes use reactive gases, including dry-etch gases such as hydrogen chloride, hydrogen bromide, chlorine and silicon tetrachloride, and production gases such as arsine and phosphine, and ammonia, which is a precursor of nitride semiconductor materials such as gallium nitride, silicon nitride, and indium nitride. These electronic reactive gases are often required to not have more than low ppb or sub-ppb impurity levels to ensure that the impurities do not degrade the quality, and hence the performance of the semiconductors produced or treated by those gases. Specifically, the semiconductor industry requires ammonia gas (NH3) to have the purity level of "superammonia," a term of art used to describe ammonia gas that does not contain more than about 1 ppb level impurities. While moisture is usually the main contaminant in high-purity ammonia, other impurities may also exist in ammonia gas such as oxygen, carbon oxides, and volatile organics—especially lower hydrocarbons such as volatile alkanes. In some cases, ammonia gas may accommodate amines and sulfur-containing molecular impurities. Thus, gas purification systems are widely used in the manufacture of semiconductors to remove process gas impurities to very low, trace concentrations.

The desire to develop methods to reduce impurities in process gases down to sub-part-per-million (sub-ppm) or sub-ppb concentrations is further driven by the present ability to measure impurities at extremely low levels. Modern analytical instrumentation such as Fourier Transform Infra Red Spectrometry (FTIR) and Gas Chromatography-Pulsed Discharge Helium Ionization Detector (GC-PDHID) permits the detection of process gas impurities such as carbon monoxide, carbon dioxide, oxygen, and moisture ($H_2O$) at sub-ppm concentrations, down to about 10 ppb. Atmospheric Pressure Ion Mass Spectrometry (APIMS) permits detection of contaminants in inert and non-reactive gases, such as nitrogen and argon, in the 10–100 parts per trillion (ppt) range.

The advances in the detection of trace levels of hydrocarbons using the above-described analytical instrumentation has motivated researchers to further reduce the levels of these impurities in ultra-pure process gases to below the limits of detection of these ultra-sensitive instrumentations. One challenge has been to develop gas purification materials and techniques that remove hydrocarbon impurities from an ultra-pure gas without adding trace amounts of other impurities.

One known method of gas purification involves the adsorption of process gas impurities on a bed or column of solid scavenger material. In these solid adsorption methods, impurities are caught by the surface of the scavenger material while the process gas preferably passes unaltered through the bed or column. Commonly used solid scavenger adsorption materials include alumina, silica, silica-alumina, other metal oxides such as titania and zirconia, mixed oxides, clays, molecular sieves (e.g., zeolites), and activated carbon. Activated carbon, for example, is used in PSA (Pressure Swing Adsorption) plants and for solvent recovery from air in painting facilities (See, for example, Wood and Stampfer, *Carbon,* 30:593 (1992); Wood and Stampfer, *Carbon,* 31:195 (1993); Nelson et al., *Am. Ind. Hyg. Assoc. J.,* 33:797 (1972); and Nelson et al., *Am. Ind. Hyg. Assoc. J.,* 52:235 (1991)). However, the use of solid scavenger adsorption materials operating at ambient conditions to reduce low parts-per-million (ppm) or high parts-per-billion (ppb) levels of impurities, particularly hydrocarbons, to low ppb or sub-ppb levels without contaminating the gas stream with other impurities, such as moisture, is not known.

Conventionally activated carbon, for example, is known as a very effective adsorbent for removing hydrocarbon impurities from gases. However, conventionally activated carbon is typically activated at 200° C. to 400° C. in gas streams contaminated with ppm levels of impurities such as moisture and $CO_2$. After conventional activation, the carbon material contains trace amounts of water and $CO_2$ that are either not completely removed during activation or re-adsorbed in the contaminated environment of the treatment process. The carbon material may also produce trace amounts of moisture and $CO_2$ during thermal activation due to chemical reaction of residual functional groups or adsorbed species, such as by dehydroxylation or decarboxylation reactions. Furthermore, gas impurities such as moisture may be generated upon contacting conventionally activated carbon material with reactive gases, through reactions of the reactive gas with surface impurities in the carbon. The residual water and $CO_2$ in the conventionally activated carbon material are then released in small quantities into a gas stream during a gas purification process, thereby causing significant contamination of the gas and rendering the effluent gas useless for high purity applications. In some cases, conventionally activated carbon is characterized as "hydrophobic" (repels or fails to adsorb water), even though in some cases activated carbon has been shown to weakly adsorb moisture upon exposure of a gas containing several hundreds to several thousands of ppm of moisture (see, for example, Barton et al., *Carbon*, 22:22 (1984). However, this adsorbed moisture is also easily released into a process gas stream during purification of the gas. Thus, reducing hydrocarbon impurities in a process gas to sub-ppb levels while maintaining very low levels of water vapor and $CO_2$ has proven extremely difficult.

Among the methods utilized in the prior art for removing water from ammonia is the use of moisture-sorptive molecular sieves. The difficulty of employing such method for the production of high-purity ammonia for semiconductor applications is that ammonia is competitive with water for the adsorption sites on the molecular sieves. As a result, it is not possible to obtain the necessary low residual water values, on the order of part-per-billion concentrations of water in the effluent, using conventionally activated molecular sieves.

JP10297919A2 to Nissan Chemical Industry Ltd., discloses a process for purifying ammonia water by evaporation to liquid ammonia, subjecting the liquid ammonia to adsorption treatment over activated carbon, distilling the ammonia under pressure, and finally introducing ultra-pure water into the purified liquid ammonia at a desired ratio.

JP6024737A2 to Iwatani International Corporation describes the elimination of carbon dioxide impurity from ammonia gas by passing the ammonia gas through a solid alkali layer and removing the impurity by adsorption.

JP55090419A2 to Daikin Ind. Ltd., discloses selective removal of sulfur compounds such as mercaptans from ammonia by adsorption over an activated carbon.

None of the above-described patents discloses an effective purification method for ammonia gas based on adsorption on activated carbon to remove impurities in the ammonia gas to a level of below about 100 ppb, while not concurrently adding impurities such as moisture at ppm levels or higher into the purified ammonia gas stream.

U.S. Pat. No. 5,704,965 to Tom et al. teaches a method for storing and dispensing sorbable gases such as ammonia, silane, germane, arsine, and phosphine, comprising physically sorptively loading the gas on a carbon sorbent material, wherein the gas is physically adsorbed by the pores, surfaces, and microcavities of the carbon sorbent material. U.S. Pat. No. 5,704,965 does not teach using the carbon material to reduce concentrations of trace impurities from the gases.

SUMMARY OF THE INVENTION

Accordingly, one aspect of this invention is to provide a method for reducing the concentration of hydrocarbon impurities as well as other contaminants in an inert or non-reactive process gas to levels on the order of sub-parts-per-billion (sub-ppb), without concurrently emitting higher levels of other contaminants, such as water vapor and $CO_2$, into the inert and non-reactive process gas being purified.

More specifically, this invention provides a method for producing an ultra low emission carbon material, referred to herein as a "ULE" carbon material, for purifying inert and non-reactive gases, comprising:

a) heating a carbon material under inert conditions at a temperature and for a time sufficient to remove substantially all of the water and carbon dioxide ($CO_2$) contained in the carbon material to produce a ULE carbon material, and b) transferring the ULE carbon material to a container under conditions that do not allow moisture, carbon dioxide, or other atmospheric contaminants to be reintroduced into the ULE carbon material.

This invention further provides ULE carbon materials, referred to herein as "ULE" carbon materials, for reducing concentrations of trace impurities (contaminants) in inert and non-reactive process gas streams such as helium (He), nitrogen ($N_2$) and argon (Ar) to levels on the order of parts-per-billion (ppb) and sub-parts-per-billion (sub-ppb), wherein the impurities include, but are not limited to, carbon monoxide (CO), carbon dioxide ($CO_2$), small amounts of water vapor, and organic compounds including, but not limited to, hydrocarbons.

This invention further provides a one-component gas purifier system comprising a bed of a ULE carbon material of this invention, wherein the one-component gas purifier system is capable of reducing concentrations of trace impurities in inert or non-reactive process gases to levels on the order of ppb and sub-ppb levels, wherein the impurities include, but are not limited to, carbon monoxide, carbon dioxide, water vapor, and organic compounds including, but not limited to, substituted and unsubstituted hydrocarbons, wherein said hydrocarbons include saturated, unsaturated, and aromatic hydrocarbons.

This invention further provides a two-component gas purifier system for purifying inert and non-reactive gases, wherein the purifier comprises a ULE carbon material of this invention and a secondary scavenger material capable of removing impurities such as oxygen and larger quantities of moisture that are not scavenged by the ULE carbon material. The secondary purifier material is referred to herein as a "secondary scavenger." The two-component purifier system of this invention acts as a combination gas purifier capable of producing a purified inert or non-reactive gas with only sub-ppb levels of impurities, such as carbon monoxide, carbon dioxide, oxygen, water vapor, and organic compounds including, but not limited to, substituted and unsubstituted hydrocarbons, wherein said hydrocarbons include saturated, unsaturated, and aromatic hydrocarbons.

This invention further provides a method for reducing the concentration of hydrocarbon impurities as well as other impurities in reactive fluids, e.g., a gas, vapor, liquid, multiphase fluid, etc., to levels on the order of sub-parts-per-billion (sub-ppb), without concurrently emitting very low levels of other contaminants such as water vapor and $CO_2$ into the reactive fluid being purified.

More specifically, this invention provides a method for producing a preconditioned ultra-low emission carbon material, referred to herein as P-ULE carbon materials, for purifying reactive fluids, comprising:

a) heating a carbon material under inert conditions at a temperature and for a time sufficient to remove substantially all of the water and carbon dioxide ($CO_2$) contained in the carbon material to produce a ULE carbon material, b) preconditioning the ULE carbon material by the method comprising:
 i) purging the ULE carbon material with an ultra-purified reactive fluid at room temperature for a specific period of time,
 ii) heating the ULE carbon material under the ultra-purified reactive fluid purge at a temperature range of about 50° to 400° C. for between a few hours and a few days, thereby producing a P-ULE carbon material, iii) cooling to ambient temperature, and c) transferring the P-ULE carbon material to a container under conditions that do not allow moisture, carbon dioxide, or other atmospheric contaminants to be reintroduced into the P-ULE carbon material.

This invention further provides "preconditioned ultra-low emission" (P-ULE) carbon materials for reducing concentrations of trace impurities in reactive fluids such as ammonia ($NH_3$), hydrogen chloride (HCl), hydrogen bromide (HBr) and chlorine ($Cl_2$) to levels on the order of parts-per-billion (ppb) and sub-parts-per-billion (sub-ppb), wherein the impurities may include (for example, $CO_2$ impurity is not removed from HBr), but are not limited to, carbon monoxide (CO), carbon dioxide ($CO_2$), small amounts of water vapor ($H_2O$) and organic compounds including, but not limited to, hydrocarbons.

This invention further provides a one-component reactive gas purifier system comprising a bed of a P-ULE carbon material of this invention, wherein the one-component gas purifier system is capable of reducing trace amounts of impurities in reactive fluids to levels on the order of parts-per billion (ppb) and sub-parts-per-billion (sub-ppb), wherein the impurities may include carbon monoxide (CO), carbon dioxide ($CO_2$), small amounts of water vapor ($H_2O$) and organic compounds including, but not limited to, hydrocarbons.

This invention further provides a two-component reactive gas purifier system for purifying reactive fluids, wherein the purifier comprises a P-ULE carbon material of this invention and a secondary scavenger material capable of removing impurities such as oxygen and larger quantities of moisture that are not scavenged by the P-ULE carbon material. The two-component reactive fluid purifier system of this invention therefore acts as a combination reactive gas purifier where the P-ULE carbon removes CO, $CO_2$, and volatile organic compounds such as hydrocarbons, and the secondary scavenger removes moisture and/or $O_2$, to provide a reactive gas stream wherein all the above impurities are reduced.

Additional novel features of this invention shall be set forth in part in the description that follows, and in part will become apparent to those skilled in the art upon examination of the following specification or may be learned by the practice of the invention. The novel features of the invention may be realized and attained by means of the instrumentalities, combinations, and methods particularly pointed out in the appended claims.

BRIEF DESCRIPTION OF THE DRAWINGS

The accompanying drawings, which are incorporated herein and form a part of the specification, illustrate preferred embodiments of the present invention, and together with the description, serve to explain the principles of the invention.

In the Drawings:

FIG. 2 is a schematic representation of a one-component gas purifying system of this invention comprising a canister containing a ULE carbon material of this invention.

FIG. 3 is a schematic representation of a two-component gas purifier system comprising a canister containing a ULE carbon material of this invention connected in series with, and downstream of, a canister containing secondary scavenger beads.

FIG. 4 is a schematic representation of an alternative embodiment of a two-component gas purifier system of the invention comprising a canister having an upstream layer of secondary scavenger beads and a downstream layer of a ULE carbon material of this invention.

FIG. 5 is a schematic representation of an alternative embodiment of a two-component gas purifier system of the invention comprising a canister having a mixture of a ULE carbon material of this invention and secondary scavenger beads.

DETAILED DESCRIPTION OF THE INVENTION

Figure 1:
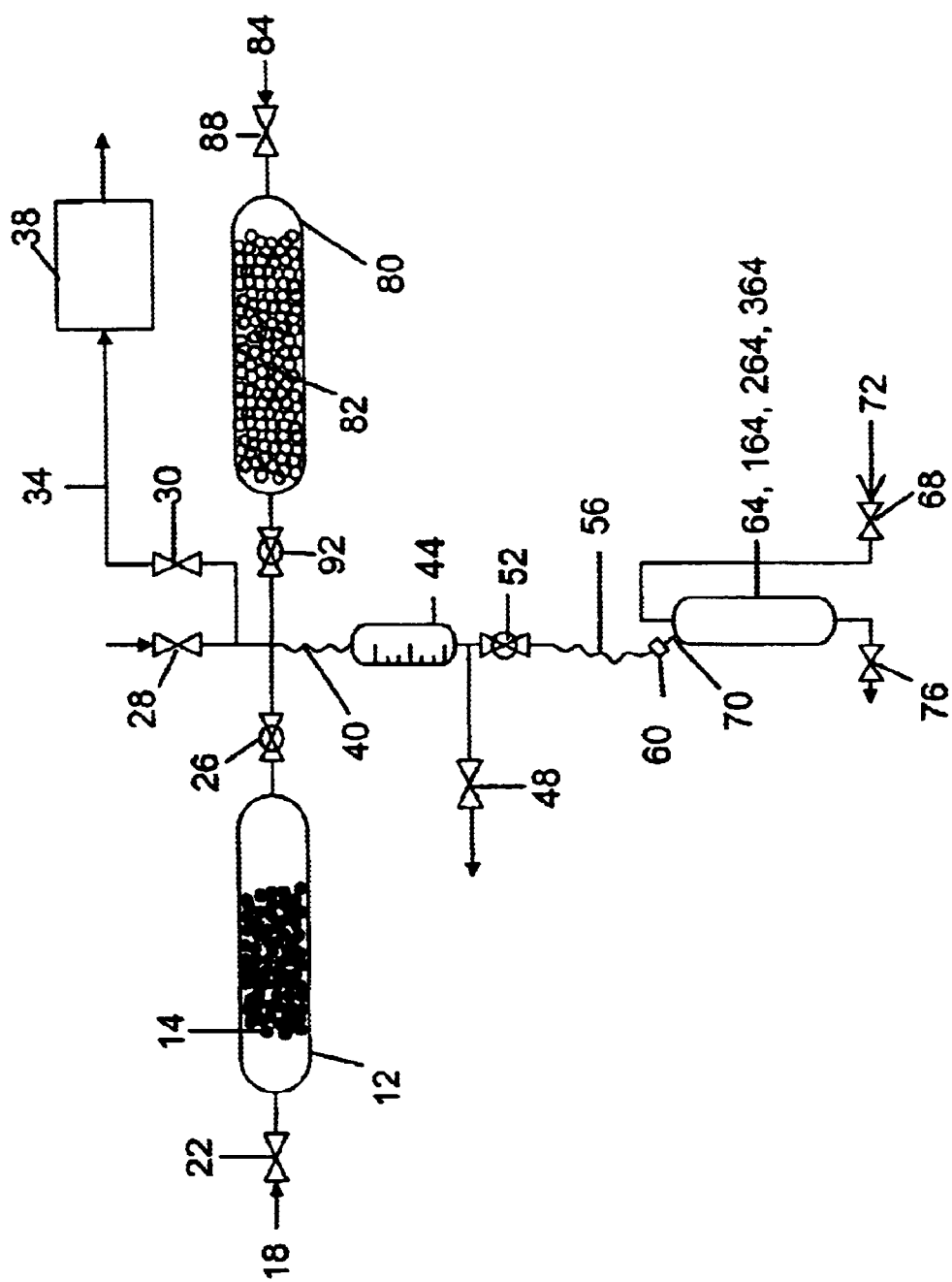
FIG. 1 is a schematic representation of the production of a ULE carbon material according to the method of this invention, including the transport of the ULE carbon material to a canister.

The present invention provides ULE carbon materials for purifying inert and non-reactive process gases such as nitrogen ($N_2$), argon (Ar) and helium (He), and a method for producing the ULE carbon materials. As used herein, the term "ultra-low emission (ULE)" carbon material refers to a carbon material that is sufficiently dehydrated to display strong hydrophilic properties and that, upon contact with a contaminated inert or non-reactive process gas containing sub-parts-per-billion (sub-ppm) levels of water vapor ($H_2O$), is able to reduce the concentration of trace impurities in inert and non-reactive gases without concurrently emitting water vapor into the inert or non-reactive gas. The ULE carbon materials of this invention are further able to reduce the concentrations of trace impurities including, but not limited to, carbon monoxide (CO) carbon dioxide ($CO_2$), and organic compounds including, but not limited to hydrocarbons, from inert and non-reactive process gases contaminated with such impurities to sub-ppb levels.

The present invention further provides preconditioned ultra-low emission (P-ULE) carbon materials for purifying reactive fluids such as ammonia ($NH_3$), hydrogen chloride (HCl), hydrogen bromide (HBr) and chlorine ($Cl_2$), and a method for producing the P-ULE carbon materials. The P-ULE carbon material is prepared by preactivating a ULE carbon material under an ultra-purified reactive fluid in order to release additional residual trace amounts of water and other impurities from the ULE carbon material. As used herein, the term "preconditioned ultra-low emission" ("P-ULE") carbon material refers to a carbon material that is sufficiently dehydrated and deactivated, and/or passivated, under ultra-purified reactive gas purge, that it does not emit any detectable levels of impurities into the gas stream and it displays strong hydrophilic properties. Upon contact with a reactive fluid containing sub-ppm levels of moisture, this P-ULE carbon is able to reduce the concentration of trace impurities in the reactive fluid, such as CO, $CO_2$ and organic compounds, hydrocarbons, by a factor of about 100–1000, without concurrently contaminating the fluid being purified by other impurities such as moisture.

As used herein, the terms "inert" and "non-reactive gases" include, but are not limited to, nitrogen, helium, argon, neon, xenon, and krypton.

As used herein, the term "fluid" includes gases, vapors, liquids, multiphase fluids, etc., including fluid mixtures as well as single component fluids.

As used herein, the term "reactive fluid" refers to a fluid that, in the presence of organic or inorganic materials may undergo chemical reactions at low temperatures, between about 0° and 100° C. under low to moderate pressures (between about 1 and 50 atmospheres) and includes fluids such as ammonia, hydrogen chloride, hydrogen bromide, chlorine, arsine, phosphine, silicon tetrachloride, monochlorosilanes, dichlorosilanes, and trichlorosilanes.

As used herein, the term "organic compounds" includes, but is not limited to, substituted and unsubstituted compounds including, but not limited to, hydrocarbons including substituted and unsubstituted alkanes, alkenes, alkynes, aromatic compounds including arenes and heteroarenes, alcohols, thiols, ketones, ethers, amines, and organic acids. The terms "alkanes," "alkenes," and "alkynes" include straight chain and branched chain alkanes, alkenes, and alkynes. The term "aromatic compounds" includes arenes and heteroarenes. As used herein, "arenes," is intended to mean any stable monocyclic, bicyclic or tricyclic carbon ring, wherein at least one ring is aromatic. The term "heteroarene" as used herein represents a stable 5- to 7-membered monocyclic or stable 8- to 11-membered bicyclic heterocyclic ring which is either saturated or unsaturated, and which consists of carbon atoms and from one to four heteroatoms selected from the group consisting of N, O, and S, and including any bicyclic group in which any of the above-defined heterocyclic rings is fused to a benzene ring. As used herein, the term "substituted" organic compound refers to the above-listed compounds having one or more substituents, including, but are not limited to, halo (fluoro, chloro, bromo, iodo), hydroxy, nitro, amino, thio, alkoxy, aryloxy, and oxo group.

As stated above, conventionally activated carbon has been used to remove trace amounts of hydrocarbon impurities from gas streams. However, conventionally activated carbon retains enough moisture ($H_2O$) and carbon dioxide ($CO_2$) such that it adds significant amounts of water vapor and $CO_2$ to the ultra-pure gas stream during removal of the hydrocarbon impurities from the gas stream. Thus, reducing hydrocarbon impurities in a process gas to sub-ppb levels while maintaining very low levels of water vapor and $CO_2$ proven extremely difficult. The inventors have discovered that when conventional carbon material is heated in an ultra-dry, inert environment at a sufficient temperature and for a sufficient time according to the method of this invention as described below in detail, water and $CO_2$ molecules that normally occupy a significant number of sites on the conventional carbon material are driven out of the carbon material. As a result of the method of this invention, sites in the carbon material normally occupied by water and $CO_2$ in conventionally activated carbon are freed up, thereby producing a ULE carbon material. These freed-up sites are believed to have a high affinity for moisture and $CO_2$. Thus, unlike conventionally activated carbon, the ULE carbon material of the present invention has freed-up sites capable of efficiently trapping and retaining trace amounts of moisture along with other impurities from a gas stream, without concurrently emitting equal or greater amounts of moisture ($H_2O$) and carbon dioxide ($CO_2$) back into the gas being purified. In other words, the method of the present invention changes the properties of conventionally activated carbon by transforming a conventional hydrophobic carbon material, which has most or all of its available hydrophilic sites occupied by water and other sites occupied by $CO_2$ to a ULE carbon material, wherein a significant number of the strong hydrophilic sites capable of holding water molecules are unoccupied, and wherein a significant number of sites normally occupied by $CO_2$ are now unoccupied.

As stated above, since the ULE and likewise the preconditioned ultra-low emission carbon materials of this invention are strongly hydrophilic, they adsorb small amounts of moisture very efficiently, even in relatively dry (sub-ppm levels of moisture) environments. However, since the moisture capacity of the carbon materials of this invention is small, they can quickly become saturated with moisture ($H_2O$) upon contact with very small amounts of moisture. For example, the relatively dry atmosphere of a conventional glove box can still contain enough water vapor to saturate the hydrophilic sites of the ULE carbon material of the present invention in a matter of seconds. Typically, glove boxes have moisture levels of about 0.5–10 ppm, sometimes higher. Thus, if the ULE or P-ULE carbon material becomes contaminated with moisture, the carbon material may be rendered useless as a gas purifier, since the moisture-contaminated carbon may reemit moisture into the process gas stream that is being purified. Accordingly, the method of the present invention further includes an enclosed transfer and filling mechanism (i.e., a "transfill system") for transferring the ULE and P-ULE carbon materials from a high-temperature activation reactor to a gas purifier container, wherein the transfill system is in an atmosphere having moisture levels much lower than those in a conventional glove box. Thus, the transfill system prevents recontamination of the carbon materials of this invention after their production, and the container maintains the carbon materials of this invention in a substantially contaminant-free environment.

Briefly, to prepare a ULE carbon material according to the present invention, a carbon material is placed in a reactor and is activated while in the reactor by subjecting the carbon material to a relatively high temperature for a given time period. In this activation process, as the reactor temperature is lowered, the activation period (i.e., the time required to produce a ULE carbon material of this invention) must be increased accordingly. An ultra-dry inert gas flows through the carbon material contained in the reactor during the activation process, and the exhaust gas exiting the reactor may be directed to an instrument that measures the amount of water in the exhaust gas. According to the present invention, a carbon material is determined to be a ULE carbon material if a gas passing through it does not become contaminated by water vapor and/or by $CO_2$, as determined by a measurement done using an appropriate analytical instrument and subject to the detection limit of that instrument. That is, the concentration of the water vapor and/or $CO_2$ in a gas that has passed through a ULE carbon material, as monitored by the analytical instrument, will be the same or lower than that in the gas prior to contacting the ULE carbon material, regardless of whether the level of water vapor and/or $CO_2$ in the contaminated gas is above or below the detection limit of the instrument. For example, the detection limit of an APIMS spectrometer is about 0.1 ppb, while that of an FTIR spectrometer is typically about 0.1 ppm (100 ppb). The ULE carbon material of this invention is capable of removing impurities such as organic compounds, carbon dioxide, and carbon monoxide from process gases to produce ultra-pure gases, wherein the concentrations of all of the impurities in the ultra-pure gases are reduced to parts-per-billion (ppb) and sub-parts-per-billion (sub-ppb) levels.

Briefly, to prepare a preconditioned ultra-low emission (P-ULE) carbon material of this invention, a ULE carbon material prepared as described above is subjected to a preconditioning or second activation process, under a flow of an ultra-dried reactive purge gas, to remove additional moisture from the ULE carbon material. The ultra-dried reactive purge gas used during the preconditioning process is preferably the same type of gas as the gas that will be purified by the P-ULE carbon material. For example, if a P-ULE carbon material is being prepared for purifying ammonia gas ($NH_3$), then the ultra-dried reactive purge gas used in the preconditioning process would normally be ultra-dried ammonia gas. This preconditioning process is performed by heating the ULE carbon material under a flow of the ultra-dry reactive purge gas to a predetermined temperature for a predetermined period of time to produce a P-ULE carbon material, then cooling the P-ULE carbon material to ambient temperature. The P-ULE carbon material of this invention is capable of removing impurities such as hydrocarbons, carbon dioxide, and carbon monoxide from reactive fluids. The P-ULE carbon material can be used to produce ultra-pure reactive fluids, wherein the concentrations of all impurities such as hydrocarbons and carbon oxides (carbon dioxide and carbon monoxide) in the purified reactive fluid are reduced to levels on the order of parts-per-billion (ppb) and sub-parts-per-billion (sub-ppb), and the concentration of moisture in the purified reactive fluid is less than or equal to about 100 ppb (i.e., below the detection limit of the instrumentation capable of measuring water content in reactive fluids).

The Carbon Material:

The ULE carbon materials and the P-ULE carbon materials of this invention are preferably made from commercially available activated carbon materials and may have any suitable size, shape, and conformation, including beads, pellets, granules, tablets, powders, particulates, or extrudates. Preferably ULE and P-ULE carbon materials are prepared from a high-hardness carbon that produces only small amounts of carbon dust under typical working conditions for gas purification processes such as space velocities (volume of gas at standard temperature and pressure flowing per hour per unit volume of purifier) up to 10,000 per hour. One example of a preferred high-hardness carbon is that described in U.S. Pat. No. 5,704,965 to Tom et al., which is specifically incorporated herein by reference. Low carbon dust emission avoids the blockage of particle filters that are typically installed downstream of purifier beds, and thus prevents the gas stream from being interrupted by a blocked filter. A ULE or P-ULE carbon material of this invention can be derived from commercially available carbon materials, which may be activated or non-activated carbon. Suitable carbon materials for use in the present invention include carbon beads supplied by Advanced Technology Materials Incorporated ("ATMI" carbon), designed for safe delivery systems (SDS) for hazardous and reactive gas storage. ATMI carbon material is preactivated by Advanced Technology Materials Incorporated at 800° C. but is neither maintained in a suitable fashion after activation to meet the criterion for ULE carbon nor analyzed for emissions. Another suitable carbon material for the production of ULE carbon material is Norit® activated carbon supplied by the Aldrich Chemical Company.

Activated carbon is commercially available, and in fact such a commercial product is a preferred starting material for use in accordance with this invention to produce a ULE carbon material of this invention. However, as stated above, such commercially available activated carbon is too contaminated with moisture, $CO_2$ and other impurities to be suitable for the gas purification requirements of the present invention. While commercially available carbon material is effective for removing hydrocarbon impurities from a process gas, it simultaneously emits water vapor and other oxygenated impurities into the process gas during a gas purification process at levels well above 1 ppb. The activation of conventional carbon material to produce ULE carbon materials according to the method of this invention overcomes the deficiencies of conventional carbon material, in that the ULE carbon material is capable of producing purified process gases while concurrently keeping moisture levels in the purified gas well below one part-per-billion (ppb). That is, ULE carbon materials of this invention do not add water vapor to a gas stream that passes though the ULE carbon material during a gas purification process.

In one preferred embodiment of this invention, a ULE carbon material is prepared from ATMI carbon beads. ATMI carbon beads used in this invention are spherical and have a diameter of about 0.7–1.0 millimeter. The spherical shape of the beads permits a high packing density in a canister of a gas purifier system without causing a significant pressure drop as gas flows through the densely packed beads during a gas purification process. Additionally, the ATMI carbon beads are very hard, and produce no visible amount of dust during gas purification.

Production of Ultra-low Emission (ULE) Carbon Materials

While the method of preparing ULE carbon materials as described below utilizes ATMI carbon beads, such a description is merely for ease of explanation. Thus, it will be understood by those of skill in the art that other carbon materials may be likewise suitable for use in the method of this invention.

In one embodiment of this invention, ATMI carbon beads are activated to remove moisture ($H_2O$) and $CO_2$ from the beads by heating the beads in a reactor at a sufficient temperature, preferably from 300° C. to 800 C., and more preferably from 500° C. to 700° C. During the heat activation, an ultra-dry inert gas such as nitrogen, helium or argon, or any combination thereof, is flowed through the reactor. As used herein, an ultra-dry inert gas refers to an inert gas that has been purified by flowing the gas through a suitable purifier, such as that disclosed in U.S. Pat. No.

4,603,148, which is specifically incorporated herein by reference, to decrease the level of moisture impurity in the inert gas to below about 1 ppb. The carbon beads are heated under the inert gas flow for at least several hours, more preferably between about twenty four hours and five days, depending on the temperature.

During the activation process performed according to the method of this invention, the levels of impurities (e.g., moisture and $CO_2$) emitted from the carbon beads into the inert gas are preferably monitored using a hygrometer or Atmospheric Pressure Ion Mass Spectrometry (APIMS) instrumentation. Activation of the carbon beads under an inert gas flow is determined to be complete when the moisture ($H_2O$) and $CO_2$ levels measured in the inert gas stream exiting the reactor at the activation temperature indicate that moisture and $CO_2$ at room temperature are the same or less than the levels of these impurities in a contaminated gas prior to purification with the ULE carbon material. Preferably these levels would be less than about 1 ppb at room temperature. Typically, emissions of about 10 ppm or less of moisture as measured at carbon material temperatures above about 500° C. are sufficient to guarantee that a ULE carbon material has been produced, that is, that the emission of moisture and $CO_2$ from the ULE carbon material will not exceed about 1 ppb after the carbon material has been cooled back to ambient temperature.

FIG. 1 illustrates one embodiment of the present invention for producing a ULE carbon material for purifying inert and non-reactive gases in accordance with this invention and for transporting the ULE carbon material to a canister for use in a gas purifier system. In FIG. 1, heat reactor 12 contains a supply of carbon beads 14 that are to be superactivated in accordance with the invention. A dry, purified inert gas 18 such as helium, nitrogen, or argon, enters reactor 12 through inlet valve 22 and flows through carbon beads 14 during the activation process. Carbon beads 14 within heat reactor 12 are subjected to a high temperature, preferably from about 300° C. to 800° C., and more preferably from about 500° C. to 700° C., for at least several hours, more preferably between about twenty four hours and five days, depending on the temperature, as ultra-dry inert gas 18 flows continuously through carbon beads 14 in heat reactor 12. Inert gas 18 exits heat reactor 12 at outlet ball valve 26 and continues on through valve 30 to instrumentation 38. Instrumentation 38 monitors the chemical content of inert gas 18 exiting reactor 12 to determine when the activation of carbon beads 14 is complete. In one embodiment, instrumentation 38 is a hygrometer commercially available from Meeco, Ametek, or Panametrics, which monitors inert gas 18 exiting reactor 12 for moisture content. When the moisture ($H_2O$) content of inert gas 18 exiting reactor 12 at the activation temperature is reduced to the levels where sub-ppb emissions of moisture ($H_2O$) from the ULE at room temperature are guaranteed, typically less than 10 ppm at 500° C., activation of carbon beads 14 is complete. The ULE carbon beads 14 are then cooled, preferably to ambient temperature, while in reactor 12. Room temperature emissions of moisture and $CO_2$ can be verified at sub-ppb levels by replacing hygrometer instrumentation 38 with APIMS instrumentation.

Production of Preconditioned Ultra-low Emission (P-ULE) Carbon Materials

The P-ULE carbon material of this invention for the purification of reactive fluids is prepared by subjecting the ULE carbon material prepared as described above to a preconditioning or second activation process, whereby further residual impurities such as moisture are released from the carbon material. To perform the preconditioning process, the ULE carbon material is first treated by purging with a purified reactive purge gas through the ULE carbon material at room temperature for a period of time between about one hour and about one day. The purified reactive purge gas may be ultra-purified ammonia that has been purified over a purifier such as that disclosed in U.S. Pat. No. 4,603,148, which is specifically incorporated herein by reference. Further, the reactive gas used as the purge gas may be the same type of reactive fluid that will be purified by the P-ULE carbon material. That is, if a P-ULE carbon material is being prepared for the purification of ammonia gas, then the reactive purge gas will usually also be ammonia gas.

After purging the ULE carbon material with the reactive purge gas at room temperature for a period of time, the carbon material is heated under the reactive purge gas flow to a desired temperature in the range of about 50° C. to 400° C., during which time an additional amount of residual moisture is released from the ULE carbon material, as monitored by an FTIR instrument. The carbon material is heated at the elevated temperature for a period of time ranging from a few hours to a few days, such that when the carbon material is cooled to ambient temperature, the moisture concentration contained in the reactive purge gas exiting from the canister holding the carbon material is below the detection limit of the FTIR instrument, that is, below about 10–100 ppb. At this point, the carbon material has reached a state defined herein as a "preconditioned ultra-low emission (P-ULE) carbon." While not wishing to be bound by any theory, the inventors believe that the second activation process with the reactive purge gas prevents further release of impurities from the carbon material by deactivation or passivation processes. In other words, the reactive purge gas may be acting either as a carrier gas for the impurities and consequently "carry" additional impurities out of the carbon material, and/or the reactive purge gas may react chemically with the carbon material to produce and remove additional moisture.

The P-ULE carbon material of this invention is capable of reducing trace impurities from reactive fluids, including gases, vapors, liquids, multiphase fluids, etc., including fluid mixtures as well as single component fluids, to levels on the order of parts-per-billion (ppb) and sub-parts-per-billion (ppb), without concurrently emitting water vapor into the reactive fluid as it passes through the P-ULE carbon material. These results are surprising and unexpected, since reactive hydride fluids, including ammonia, are known to have a high affinity for carbon materials, as disclosed in U.S. Pat. No. 5,704,965 to Tom, et al. Therefore, one of ordinary skill in the art would expect that the reactive fluid (e.g., ammonia) would compete with the impurities (e.g., hydrocarbons or moisture) for sites on the P-ULE carbon material, thereby rendering the P-ULE carbon material ineffective for purification of reactive fluids. In contrast, the inventors discovered that the removal of trace contaminants such as hydrocarbons from ammonia occurs with very high efficiency, and that the P-ULE carbon material of this invention has a capacity of a few liters of these contaminants (in the gas phase under standard conditions) per liter of P-ULE carbon material.

Transfill of the Ultra-low Emission (ULE) Carbon:

In order to minimize the contamination of the ULE or P-ULE carbon by re-adsorption of moisture and other oxygenated materials such as $O_2$ and $CO_2$, the present invention provides a completely enclosed transfer and filling ("transfill") system. The transfill system, illustrated in FIG. 1, comprises an environmentally sealed, contamination-free transfer system that operates to physically transport a portion of the ULE carbon beads 14 from the reactor to individual canisters while maintaining the ULE carbon material in a substantially contaminant free environment. That is, the transfill system allows the ULE carbon material to be transferred to individual containers without allowing moisture, carbon dioxide, or other contaminants to come into contact with the ULE carbon material. The individual containers can then be incorporated into gas purifier systems. While FIG. 1 is describes the transfer of ultra-low emission carbon material to individual canisters, this is merely for ease of explanation. Thus, it will be understood that the transfill system can also be used for transferring the preconditioned ultra-low emission carbon material to individual canisters.

Referring again to FIG. 1, the ULE carbon beads 14 are first transferred from the reactor 12 under a flow or an ultra-dry inert gas such as nitrogen through opened ball valve 26 to a calibrated glass cylinder 44 via gravity fill. Specialized ball valves such as ball valve 26 are desirable in order to minimize contamination of the ULE carbon beads 14. A flexible line 40 allows the orientation of reactor 12 to be changed from the horizontal position used for activation of the carbon beads to a vertical position for the transfill process. The ULE carbon beads 14 are transferred to calibrated cylinder 44 for volume determination under and ultra-dry inert gas flow 18 which flows through opened valves 22 and 26 and is vented through open valve 48, while all other valves in the system remain closed.

After the desired amount of ULE carbon beads 14 is collected in the calibrated cylinder 44, ball valve 26 is closed and ball valve 52 is opened to allow the ULE carbon beads 14 to flow through a flexible line 56 into a gas purifier canister 64. Canister 64 comprises a gas inlet valve 68, a gas outlet valve 76, and a receiving port 70 through which a portion of the ULE carbon beads is transferred into canister 64. This transfer process from calibrated cylinder 44 to canister 64 is conducted under an ultra-dry inert gas flow 18 through opened valve 22, which is vented through opened diaphragm valve 76. A thorough cross purge with inert gas 72 through canister 64, calibrated cylinder 44, and vent lines to instrumentation 38 is necessary to remove moisture ($H_2O$), $CO_2$, and $O_2$ contamination from the canister and the transfill system prior to the filling procedure of the canister 64 in order to purge the transfill lines and the canister 64, thereby ensuring that the ULE carbon material is not contaminated by residual impurities in the transfill system or the canister.

Once all of the ULE carbon beads 14 are transferred from calibrated cylinder 44 to canister 64 having a gas inlet valve 68, a gas outlet valve 76, with outlet valve 76 closed, and a slow reverse ultra-dry inert gas stream 72 is initiated through valve 68 and vented though valve 48. The flow of inert gas 72 should remain small to prevent blowing the ULE carbon beads out of canister 64 and back into the system. Flexible hose 56 is then disconnected from canister 64 at fitting 60 while inert gas 72 flows through valve 68 and vents through the disconnected fitting 60 to minimize contamination. The disconnection procedure is preferentially performed in a glove box or with a plastic purge bag that is inflated by an ultra pure inert gas and is attached above and below the fitting 60 to completely surround the fittings. The plastic bag provides a "micro environment" of a clean purge gas and further minimizes exposure to ambient contaminants. The open fitting 60 is then closed with a plug (not shown) while maintaining the inert gas purge 72. Canister 64, filled with ULE carbon beads, is then ready for installation in a gas purifying system.

The exact details of construction of transfill system as illustrated in FIG. 1 are not critical to the invention, since a transfill system of this invention can take a number of physical forms. Thus it will be understood by those of skill in the art that a transfill system of this invention will be constructed and arranged so as to prevent contamination of carbon beads 14. That is, the transported ULE carbon beads 14 residing in a canister 64 remain generally as highly activated as they were at the end of their activation within heat reactor 12. The above-described transfill system may also be employed to transfer P-ULE carbon materials to individual canisters.

Gas Purification Systems

One embodiment of a portion of a gas purification system of the present invention is illustrated in FIG. 2. This gas purification system comprises a one-component canister 64 containing either a ULE carbon material 14 for the purification of inert and non-reactive gases, or a P-ULE carbon material for the purification of reactive fluids. Canister 64 is prepared by the transfill process described above, and is then installed in a gas purification system for purification of gas 100.

An alternative embodiment of a portion of a gas purification system of the present invention is illustrated in FIG. 3. The system shown in FIG. 3 is a two-component gas purifier system for the purification of gas 100, wherein the two-component gas purifier comprises canister 64 containing either a ULE carbon material 14 for the purification of inert and non-reactive gases, or a P-ULE carbon material for the purification of reactive fluid, wherein canister 64 is connected in series with, and downstream of, a canister 164 containing secondary scavenger 82 for removing larger concentrations of moisture and oxygen that may be present in the impure process gas. The ULE carbon material does not remove oxygen and has only a small capacity for water vapor. The water capacity is only about 0.1% of that of typical chemical scavengers, and thus ULE carbon or preconditioned ultra-low emission carbon will not address the requirements of typical high purity gas applications, where oxygen ($O_2$) and larger amounts of moisture are key impurities. A combined bed, however, has the benefit of large oxygen and/or moisture capacities as well as the capabilities to remove organic compounds and carbon monoxide (CO).

In one embodiment, the secondary purifier is a chemical scavenger material that removes a variety of impurities such as moisture and oxygen from gas streams. In one embodiment of the gas purification system illustrated in FIG. 3, the secondary scavenger material 24 comprises a metallated macroreticular polymer, wherein the polymer is metallated with a Group IA or Group IIA alkyl or aryl organometallic compound, as described in U.S. Pat. No. 4,603,148 to Tom, which is specifically incorporated herein by reference. In another embodiment, the secondary scavenger is a zeolite molecular sieve.

Alternatively, the secondary scavenger comprises, but is not limited to, inorganic high-surface-area solids such as oxides and mixed oxides, for example, alumina, silica, silica-alumina, aluminosilicate zeolites and other molecular sieves. These materials may be modified by salts, oxides or hydroxides of the Group IA or IIA metals, and preferably are thermally activated, as described in U.S. Pat. No. 6,461,411 to Watanabe et al., which is specifically incorporated herein by reference. In one embodiment, the secondary scavenger comprises a Group IIA, IVA IIIB or IVB metal oxide such as an alumina, alumina-based oxide, silica, or a silica-based oxide. Preferably, the metal oxide has a high surface area of at least about 30 $m^2/g$. In another embodiment, the secondary scavenger is an alumina, alumina-based oxide, silica, or a silica-based oxide that has been modified by a salt, oxide, or hydroxide of a Group IA or Group IIA metal as described in U.S. Pat. No. 5,461,411 to Watanabe et al., supra. In this embodiment, the modifier comprises between about 1 to 20 percent by weight of the modified material.

In the two-component gas purifier embodiment shown in FIG. 3, preparation of canister 164 containing secondary scavenger beads 82 involves the transfill process described above from container 80 containing secondary scavenger beads 82. Referring again to FIG. 1, reservoir 80 containing secondary scavenger beads 82 is incorporated into the transfill system. The secondary scavenger beads 82 are first transferred by gravity fill into calibrated cylinder 44 through flexible line 40, during which a stream of inert gas 84 flows through valve 88 and vents through valve 48. Once a measured amount of secondary scavenger beads 82 has been transferred to cylinder 44, valve 52 is opened to allow secondary scavenger beads 82 to be transferred through flexible line 56 into canister 164, while a flow of inert gas 84 through cylinder 44 and canister 164 is maintained. After secondary scavenger beads 82 have been completely transferred to canister 164, line 56 is disconnected from canister 164 at fitting 60 while a stream of inert gas 72 flows through canister 164. Fitting 60 is closed with a plug (not shown) while the inert gas purge 72 is maintained, after which canister 164 containing resin beads 120 is ready for use in the gas purifying system as illustrated in FIG. 3. Alternatively, canister 164 can be prepared according to standard filling procedures in a glove box. This is due to the fact that the large moisture and oxygen capacity of the secondary scavenger beads causes the beads to be less sensitive to exposure of small levels of contaminants during filling than the ULE carbon material.

Canister 164 with the secondary scavenger beads 82 is then connected to canister 64 filled with the ULE carbon material. The connection is preferentially performed while flowing an ultra-dry inert gas through canister 64 while keeping the inlet and outlet of canister 164 closed, to purge contaminants from the connection with an ultra-dry inert gas prior to closing the connection.

FIG. 4 shows a portion of another embodiment of a two-component gas purifier system of the invention. The gas purifier system illustrated in FIG. 4 includes a canister 264 having an upstream portion of secondary scavenger beads 82 selected from the materials described above and a downstream portion of either a ULE carbon material 14 for the purification of inert and non-reactive gases, or a P-ULE carbon material for the purification of reactive fluids.

Canister 264 is prepared using the transfill system illustrated in FIG. 1. One embodiment of preparing canister 264 comprises first partially filling canister 264 with a measured amount of either ULE carbon beads 14 or P-ULE carbon beads using the transfill system as described above, followed by filling the remaining volume of canister 264 with the secondary scavenger beads 82 using the transfill as described above. The transfill system for preparing canister 264 includes the appropriate inert gas purges as described above to prevent contamination of canister 264 by moisture ($H_2O$), $O_2$ and $CO_2$.

FIG. 5 illustrates an alternative embodiment of a two-component gas purifier system of this invention. The two-component gas purifier shown in FIG. 5 comprises canister 364 containing a mixture of secondary scavenger beads 82 selected from the materials described above and either a ULE carbon material 14 for the purification of inert and non-reactive gases, or a P-ULE carbon material for the purification of reactive fluids. Canister 364 is prepared using the above-described transfill system for preparing canister 264. The mixing of the ULE carbon beads 14 or P-ULE carbon beads with secondary scavenger beads 82 can be performed by mechanical agitation while beads 14 and 82 are contained within calibrated cylinder 44 (FIG. 1), or after beads 14 and 82 have been transferred to canister 364.

The foregoing description is considered as illustrative only of the principles of the invention. Further, since numerous modifications and changes will be readily apparent to those skilled in the art, it is not desired to limit the invention to the exact construction and process shown as described above. Accordingly, all suitable modifications and equivalents may be resorted to falling within the scope of the invention as defined by the claims that follow.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

EXAMPLES

Example 1

Production of an Ultra-low Emission (ULE) Carbon

Figure 6:
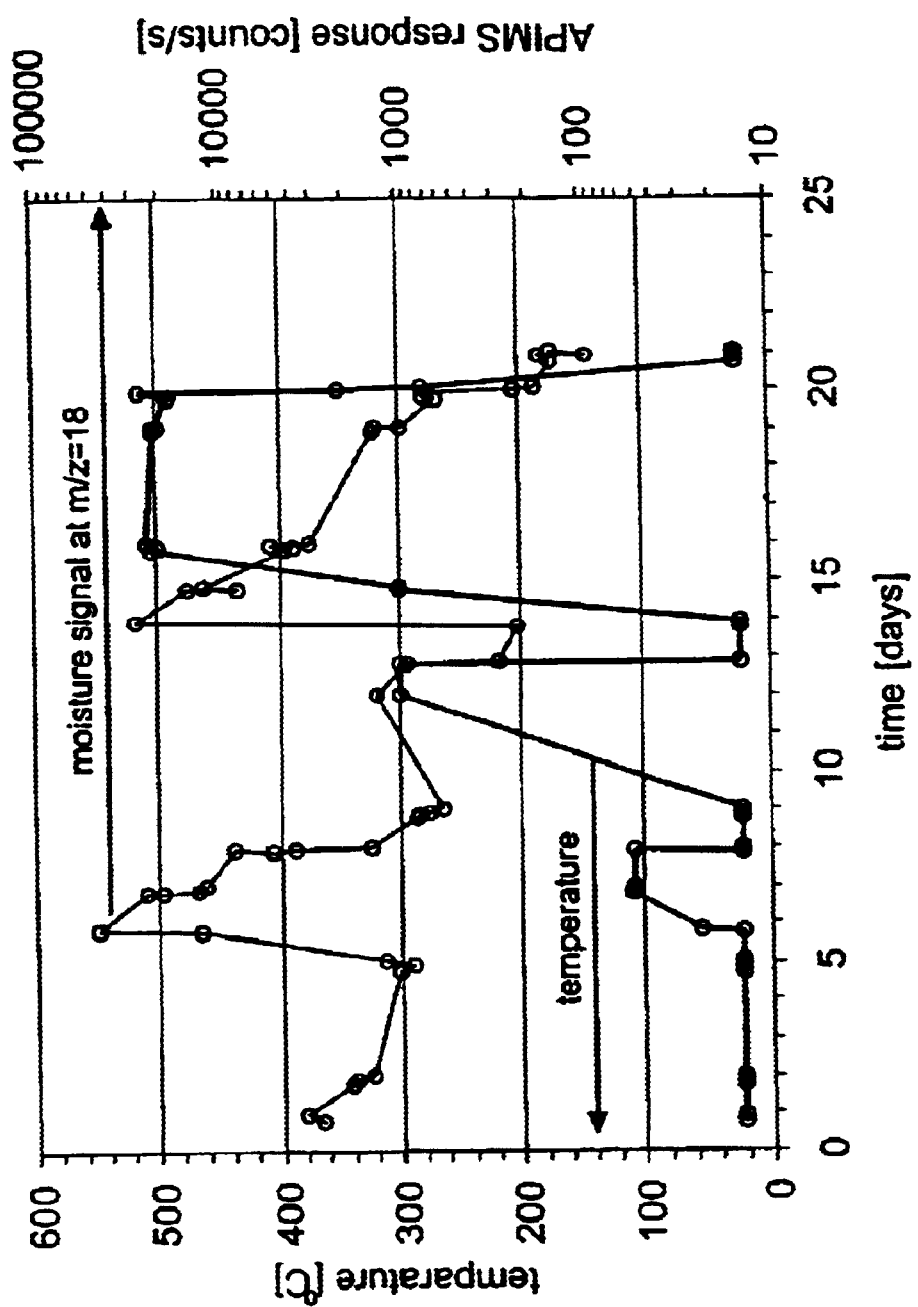
FIG. 6 is a graph plotting moisture ($H_2O$) emission (thin line) and temperature (thick line) in an exhaust gas in counts per second versus time (days) during the production of the ULE carbon beads, as measured by APIMS.

ATMI carbon beads (10 mL) were heated stepwise in a reactor over several days in an ultra-dry nitrogen atmosphere at a 2 slpm (standard liters per minute) flow rate, and the concentrations of moisture and carbon dioxide ($CO_2$) in the exhaust stream were monitored by Atmospheric Pressure Ion Mass Spectrometry (APIMS), which has a detection limit of about 10–100 parts-per-trillion (ppt). FIG. 6 shows the results obtained during monitoring of moisture emission, where the thin line represents the moisture emission levels, and the thick line represents temperature of the reactor.

The initial levels of moisture in the exhaust gas at ambient temperature decreased slowly over several days. An increase of the activation temperature from room temperature to 110° C. increased the amount of moisture in the exhaust gas stream by a factor of about 500. After cooling back to room temperature, the moisture level in the exhaust gas stream rapidly dropped to concentrations below that observed prior to heating. Further heating to 300° C. and to 500° C. resulted in an additional release of significant amounts of moisture ($H_2O$) from the carbon material. After activation of the carbon at 500° C. for five days, the moisture levels emitted into the exhaust gas stream at 500° C. approached concentrations observed in the exhaust stream at ambient temperature prior to the activation procedure, that is, about 500–1000 counts per second (cps). After cooling to room temperature, the moisture response dropped to about 100 cps, indicating sub-ppb moisture concentrations. The carbon dioxide emission followed similar trends to the moisture emission (data not shown).

Example 2

Figure 7:
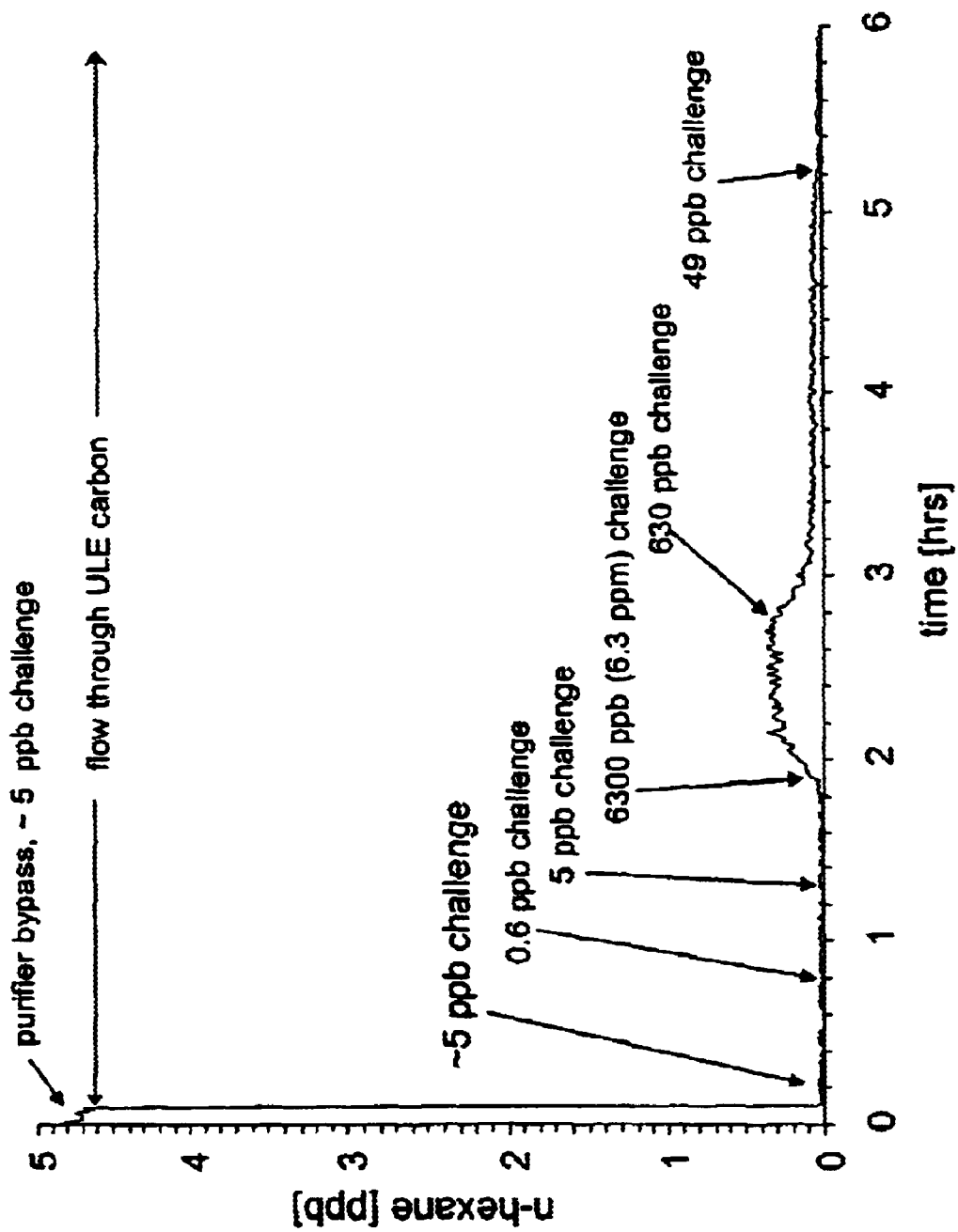
FIG. 7 is a graph plotting hexane concentration in parts-per-billion versus time in hours for various hexane challenges in a stream of argon flowing through a ULE carbon material of this invention, as measured by APIMS.

Removal of Straight-chain Hydrocarbons from a Gas Stream Using an Ultra-low Emission (ULE) Carbon Material A gas purifier comprising a densely packed bed of ULE carbon beads (60 cc) prepared according to the method of this invention was installed downstream of a calibration system capable of adding trace amounts of hydrocarbons vapors into a gas stream. The efficiency of the ULE carbon beads in removing the trace hydrocarbons from an ultra-dry argon stream was studied using APIMS instrumentation that was installed downstream of the bed of ULE carbon beads. FIG. 7 shows the results after flowing argon containing trace amounts of hexane (i.e., between about 0.6 ppb and 6.3 ppm) through a bed of ULE carbon beads at a flow rate of 2 slpm. Initially, the gas purifier containing the ULE carbon beads was bypassed to establish a 5 ppb hexane concentration in the argon gas stream. When the argon gas stream containing the hexane impurity was directed through the gas purifier, the hexane concentration in the exhaust argon gas stream exiting the purifier dropped to below the detection limit of the APIMS instrumentation. That is, the concentration of hexane in the exhaust stream was less than about 50 ppt.

While flowing through the purifier, the hexane challenge was varied between 0.6 ppb and 6.3 ppm. A slight breakthrough of about 0.5 ppb hexane was observed at the high challenge of 6.3 ppm, corresponding to a removal of hexane vapor by a factor of more than 10,000. Below a challenge of about 50 ppb the hexane concentration in the exhaust gas stream was not distinguishable from the baseline.

Example 3

Figure 8:
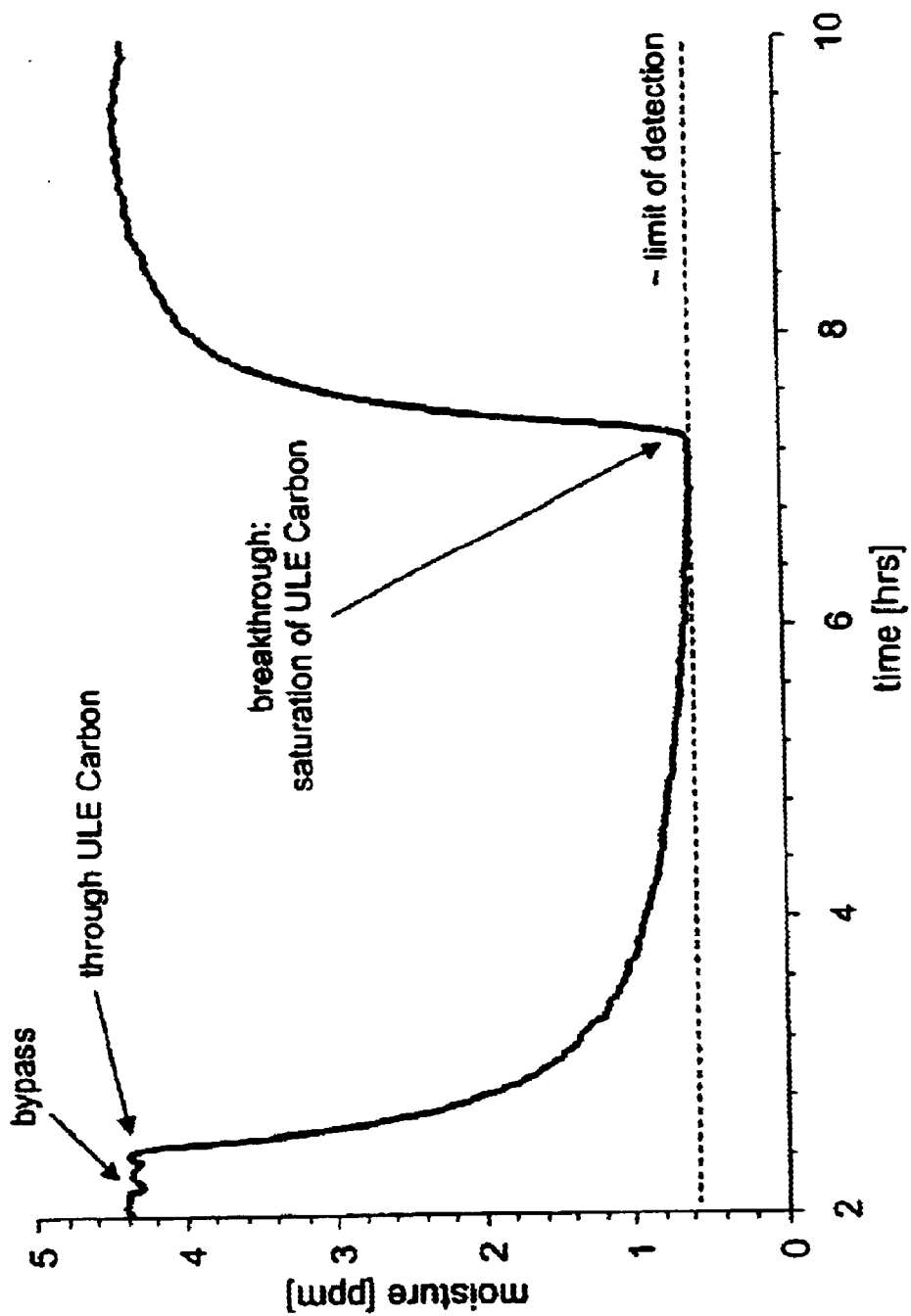
FIG. 8 is a graph plotting moisture ($H_2O$) concentration measured by an AMETEK 5850 hygrometer versus time for a gas stream that initially bypasses a ULE carbon bed and then is directed through the ULE carbon bed until moisture breakthrough occurs.

Removal of Moisture ($H_2O$) from a Gas Stream Using an Ultra-low Emission (ULE) Carbon Beads FIG. 8 shows the removal of about 5 ppm moisture challenge in nitrogen at 500 cc/min flow by a purifier containing 60 cc of ULE carbon beads. The measurements were performed with an AMETEK 5850 moisture analyzer (Ametek, Paoli, Pa.). The detection limit of the setup was about 0.5 ppm. The elimination of the water challenge confirmed that the ULE carbon beads are strongly hydrophilic. The amount of water vapor removed until breakthrough occurred was about 0.01 liter water vapor at standard conditions per liter ULE carbon beads.

Example 4

Figure 9:
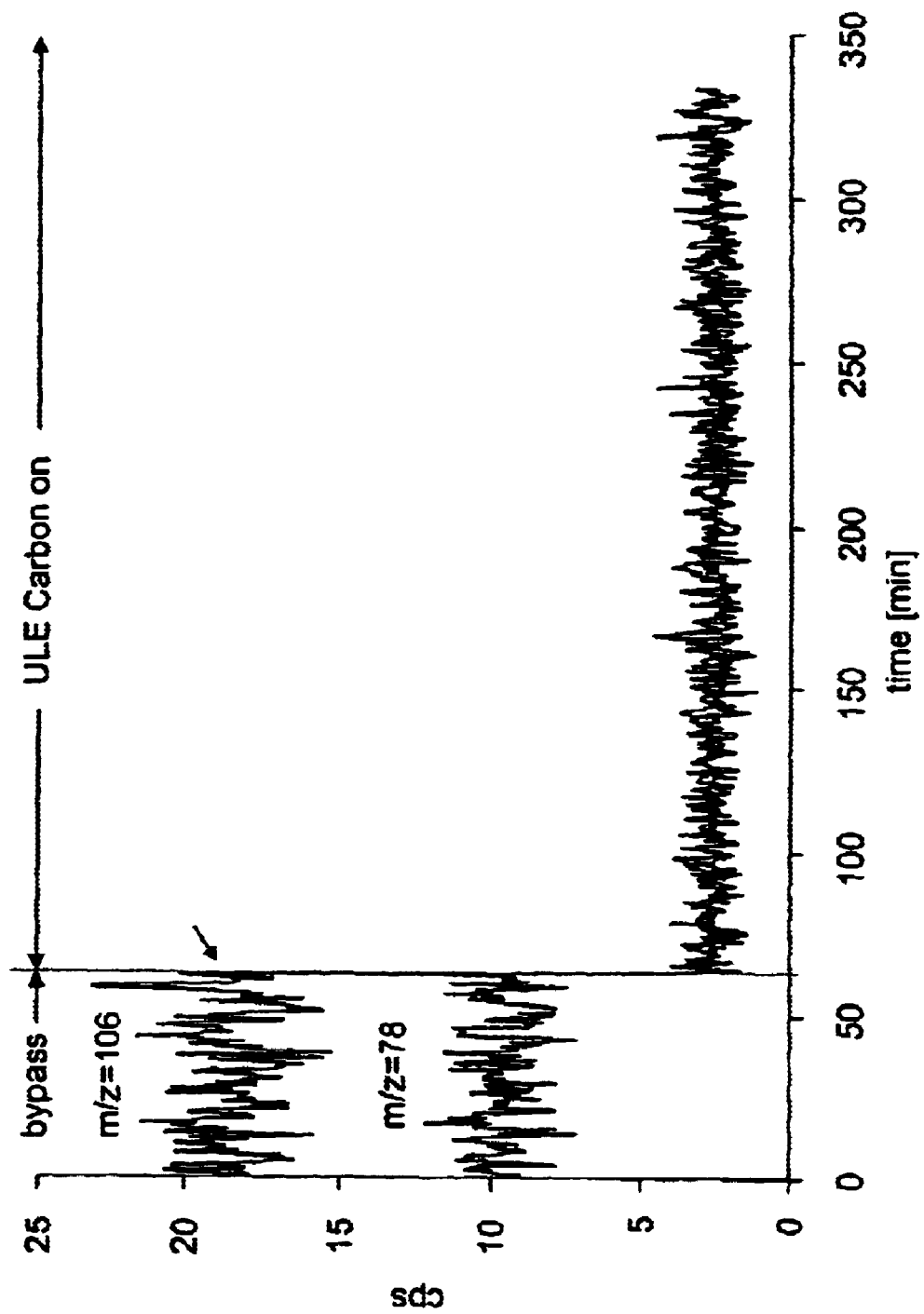
FIG. 9 is a graph plotting the response of APIMS in counts-per-second (cps) versus time in minutes of a nitrogen stream contaminated with a mixture of benzene (m/z=78) and ethylbenzene (m/z=106) that initially bypasses a ULE bed and then is directed through a bed of ULE carbon material of this invention.

Removal of Aromatic Species from a Gas Stream Using an Ultra-low Emission (ULE) Carbon Beads FIG. 9 shows the removal of trace amounts of the aromatic species benzene (m/z=78) and ethylbenzene (m/z=106) from a nitrogen stream at 2000 cc/min by a purifier filled with 10 cc of ULE carbon beads. The measurements were performed by APIMS. The instrument response at m/z=78 and m/z=106 while flowing the contaminated nitrogen through the purifier was identical to the background response obtained with a nitrogen gas stream free of benzene and ethylbenzene.

Example 5

Figure 10:
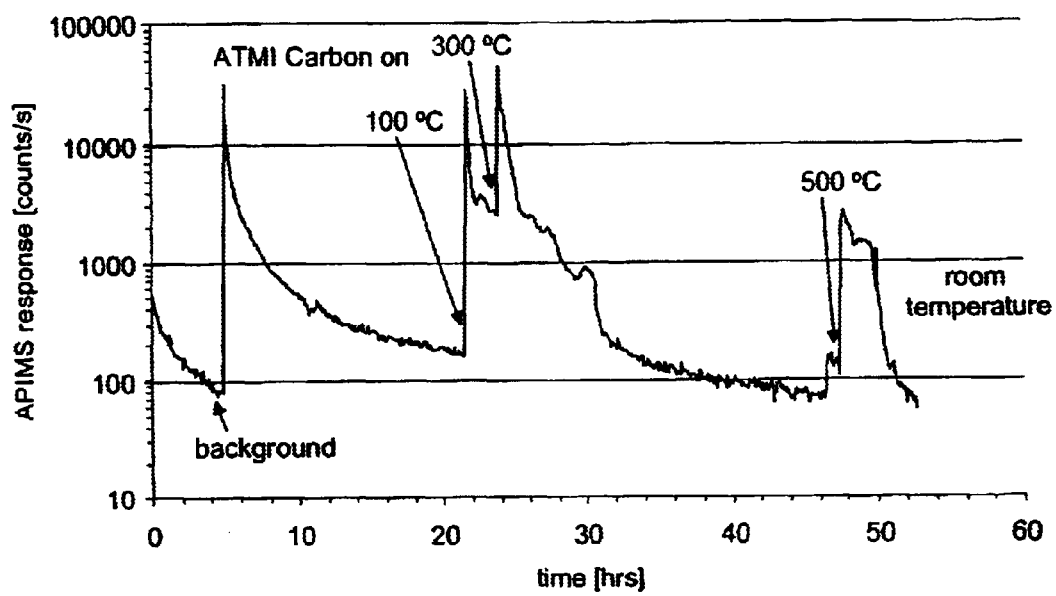
FIG. 10 is a graph plotting the moisture response of APIMS in counts per second (cps) versus time in minutes of a nitrogen stream initially bypassing and then passing through a carbon bed activated in situ by Advanced Technology Materials Incorporated in an air tight canister.

Moisture Level Measurements of an ATMI Carbon Sample Activated and Shipped in Air-tight Vessel A sample of ATMI carbon that had been activated and packaged by Advanced Technology Materials Incorporated (ATMI) was tested for moisture content. FIG. 10 shows moisture outgassing of a 50 cc carbon sample contained in an air-tight stainless steel reactor and which had been activated by Advanced Technology Materials Incorporated in-situ using cylinder quality helium (99.999% purity) as purge gas. Activation conditions used by Advanced Technology Materials Incorporated comprised heating the ATMI carbon at 800° C. for 8 hrs under 200 seem helium flow.

Outgassing of moisture from the ATMI carbon was investigated using APIMS instrumentation and a nitrogen matrix at 2 slpm. After the system was dried in an ultra-dry inert gas stream to obtain a moisture response of less than about 100 counts per second (cps), wherein 400–500 cps corresponds to about 1 ppb, and the vessel containing the ATMI carbon was switched in line. A moisture spike of about 30,000 cps was observed. After 14 hours of dry down, the response decreased to about 200 cps. The temperature was then increased to 100°, 300° and 500° C., causing further emission of significant quantities of water. The results indicated that ATMI carbon as activated and stored by Advanced Technology Materials Incorporated is not sufficient to meet the requirements for ULE carbon material. Impurities in the 5.5 grade helium purge gas, such as low ppm moisture levels, as well as insufficient conditioning times were suspected as main contributors to the observed outgassing of moisture.

Example 6

Preparation of a Preconditioned Ultra-low Emission (P-ULE) Carbon Material

A 60 ml bed of ATMI carbon material was activated at 650° C. under ultra-dry nitrogen flow (200 cc per min) for two days. After cooling to room temperature, the moisture response dropped to about 100 counts/s, indicating sub-ppb moisture concentrations. The carbon dioxide emission followed similar trends to the moisture emission. This material was then subjected to a second activation process by exposing the material to ultra-purified ammonia gas at room temperature. A substantial amount of residual moisture was released from the carbon material, as monitored with an FTIR spectrometer, which has a detection limit of about 10–100 parts-per-billion (ppb).

Figure 11:
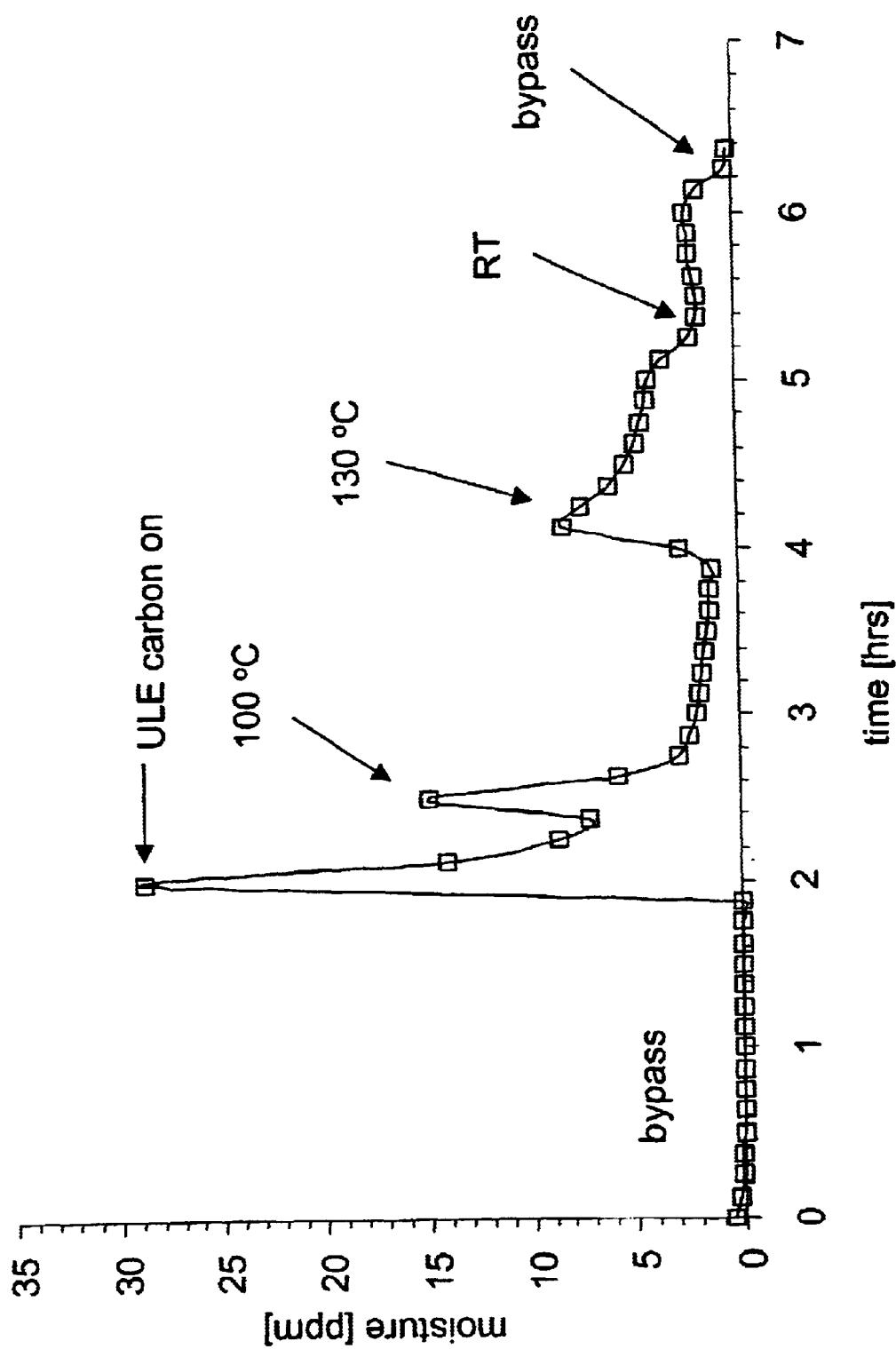
FIG. 11 is a graph plotting moisture emission at room and elevated temperatures when ULE carbon beads are subjected to ammonia gas.

FIG. 11 shows a histogram of the second activation procedure performed under ammonia gas flow. The initial 30 ppm moisture detected at room temperature diminished gradually, and when the detected moisture level dropped to about 6 ppm, the temperature was increased to 100° C. under ammonia gas flow. This caused an additional release of about 15 ppm of moisture, which dropped off after about an hour to about 2 ppm. Additional moisture was released when the temperature was raised to 130° C., under ammonia gas flow, and when the carbon material was cooled back to ambient temperature, the level of moisture released under ammonia gas flow remained at about 2 ppm for an additional hour. The gas stream flowing through the carbon material was then switched to the inert gas by-pass line, and the moisture level released from the carbon material dropped to below the FTIR detection limit, as expected. An estimate, based on extrapolation of the moisture level decay at 100° C., indicates that a moisture concentration of about 600 ppb might be reached after about six days of heating at 100° C. This concentration is equivalent to a moisture concentration of about 100 ppb (0.1 ppm) at room temperature. A faster reduction of the moisture level to below the FTIR detection limit at room temperature could be reached by applying higher second activation temperature under the ammonia gas stream, for example at temperatures of about 150° or 200° C. A carbon material releasing less than about 100 ppb moisture under ammonia stream (detection limit of the FTIR spectrometer) is considered herein to be a preconditioned ultra low emission (P-ULE) carbon for ammonia purification.

Example 7

Removal of Linear Hydrocarbons from an Ammonia Gas Stream Using an Ultra-low Emission (ULE) Carbon Material A gas purifier comprising densely packed bed of ULE carbon beads (60 cc) for purifying inert gases prepared according to the method described in Example 1 was installed downstream of a calibration system capable of adding trace amounts of hydrocarbon vapors into an ammonia gas stream. This bed of ULE carbon beads did not undergo a second treatment as described in Example 6. Therefore, when the ULE carbon beads were subjected to ammonia gas, it was assumed that the carbon beads released moisture, since it was not possible to simultaneously measure the release of water and hydrocarbons. However, it was discovered that the beads were still capable of removing hydrocarbon challenges from the ammonia.

Figure 12:
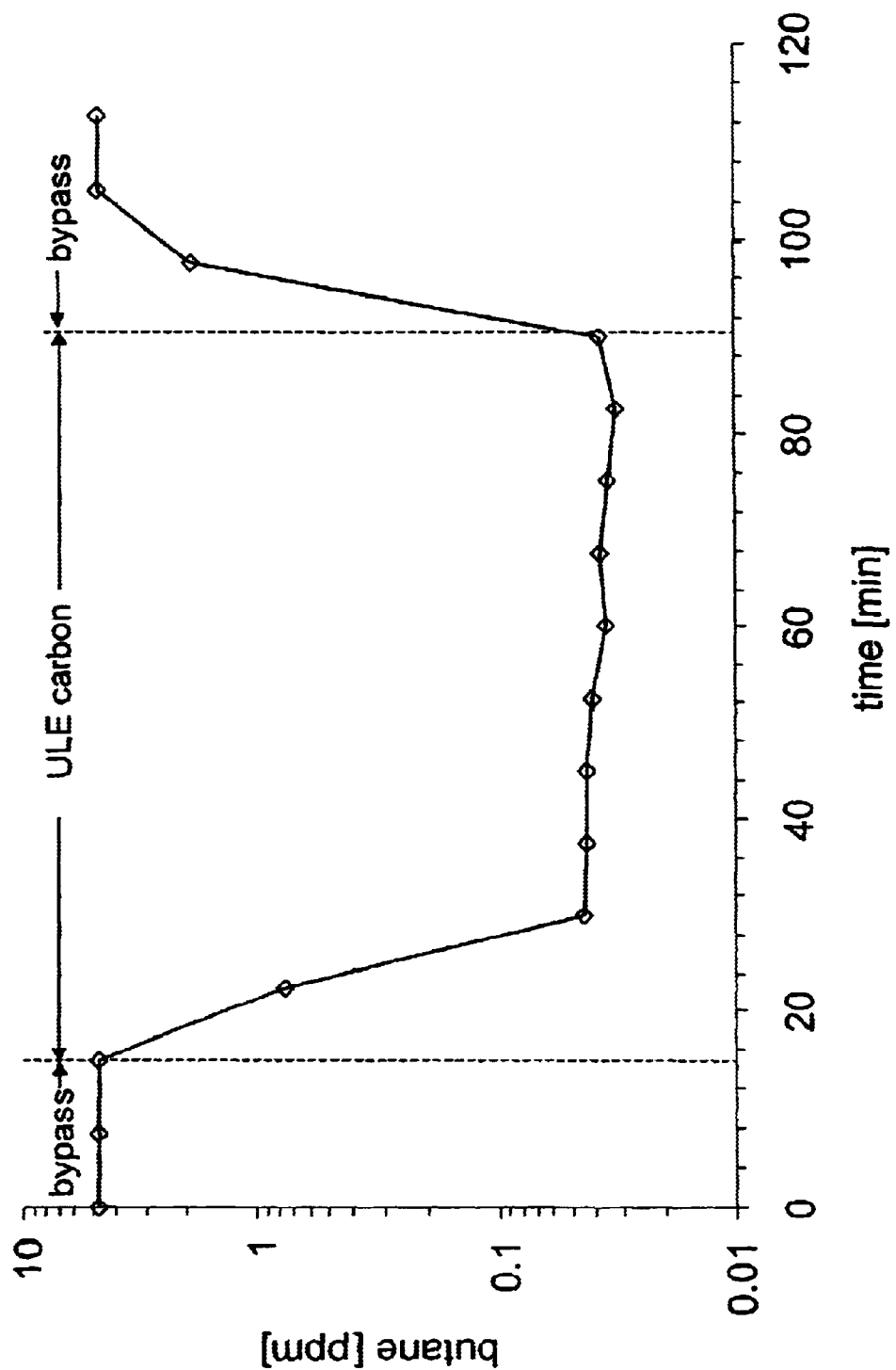
FIG. 12 is a graph showing the removal of n-butane impurity from ammonia gas by a P-ULE carbon material of this invention.

The efficiency of the ULE carbon beads in removing the trace hydrocarbons from an ultra-dry ammonia stream, flowed at 1.46 slpm under 760 torr, was monitored by FTIR spectrometry, which has a detection limit of about 10–100 parts-per-billion (ppb). Results for n-butane and n-hexane are shown in FIGS. 12 and 13, respectively.

In the case of n-butane (FIG. 12), the ammonia gas stream containing a challenge of 5 ppm n-butane was first flowed through a by-pass line for about 15 minutes and then through the purifier. Within about 15 minutes (i.e., at the 30 minute time point), the concentration of n-butane in the ammonia gas fell to about 40 ppb, which is the detection limit of the instrument under these conditions. At the 90 minute time point, the ammonia gas stream was switched back to the by-pass line and the 5 ppm challenge was completely restored within 15 minutes. Thus, the ULE carbon beads are effective in removing trace amounts of n-butane from ammonia, by a factor of over 100.

Figure 13:
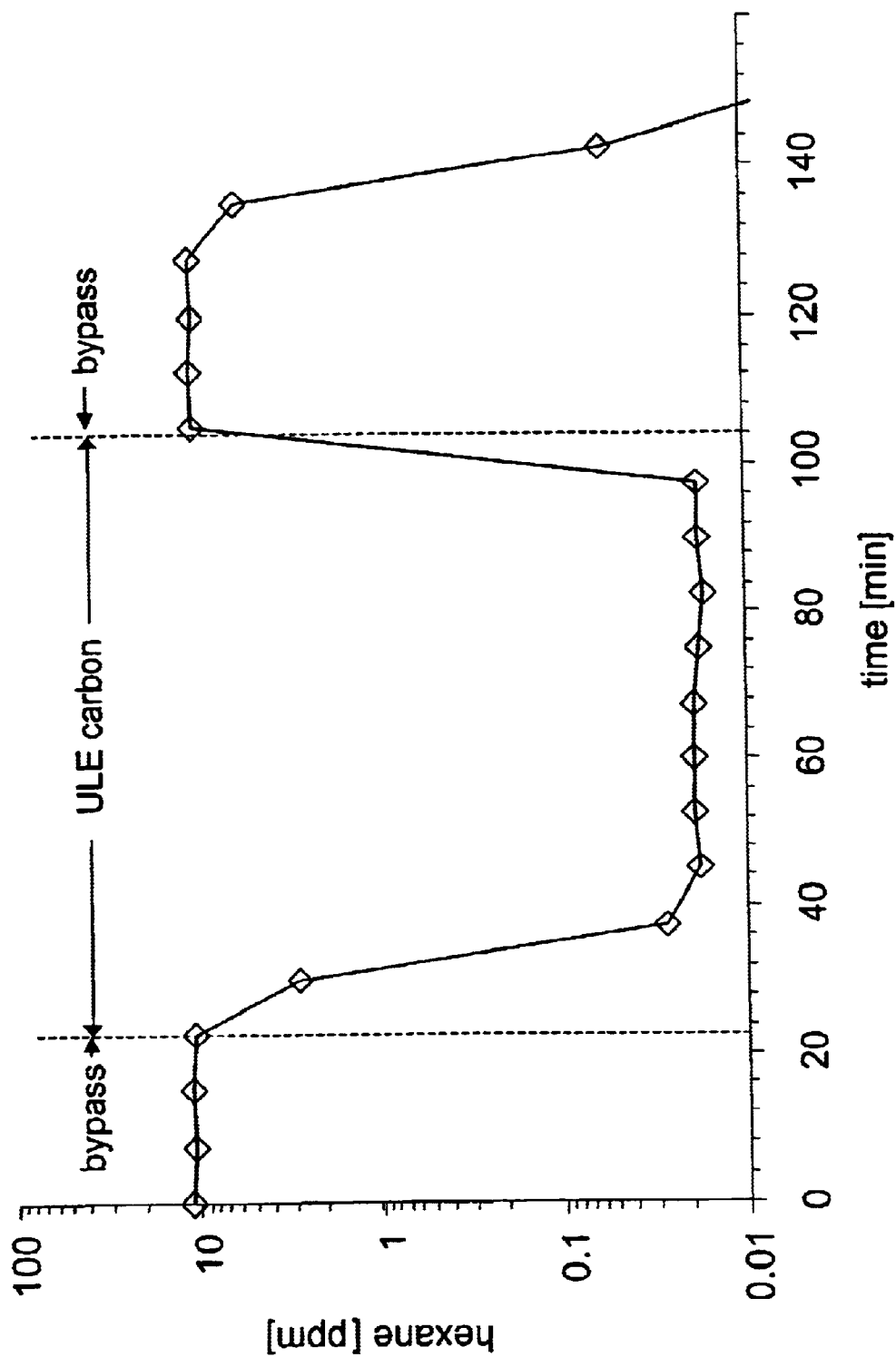
FIG. 13 is a graph showing the removal of n-hexane impurity from ammonia gas by a P-ULE carbon material of this invention.

A 10 ppm challenge of n-hexane was likewise removed effectively by the ULE carbon beads, to a level of about 20 ppb (a factor of 500), as shown in FIG. 13.

We claim:

1. A method for reducing concentrations of trace contaminants from a reactive fluid, the method comprising contacting the contaminated reactive fluid with a preconditioned ultra-low emission carbon material, wherein said preconditioned ultra-low emission carbon material reduces the concentration of the contaminants to less than 100 parts-per-billion by volume and does not emit water into the reactive fluid.

2. The method of claim 1, wherein the concentration of said contaminants in said purified reactive fluid is less than 100 parts per trillion.

3. The method of claim 1, wherein said contaminants comprise organic compounds.

4. The method of claim 3, wherein said organic compounds comprise straight chain or branched chain hydrocarbons.

5. The method of claim 4, wherein said hydrocarbon is hexane or n-butene.

6. The method of claim 1, wherein said contaminants comprise carbon dioxide.

7. The method of claim 1, wherein said contaminants comprise carbon monoxide.

8. The method of claim 1, wherein said contaminants comprise water.

9. The method of claim 1, wherein the concentration of contaminants in said reactive fluid are measured by Fourier Transform Infra Red Spectrometry.

10. The method of claim 1, wherein said reactive fluid is ammonia.

11. The method of claim 1, wherein said preconditioned ultra-low emission carbon material is maintained in a substantially non-contaminating environment prior to contact with said reactive fluid.

* * * * *